Patented Oct. 23, 1951

2,571,994

UNITED STATES PATENT OFFICE 2,571,994

FURAN RESINS

Beaumont Thomas, Watertown, N. Y., assignor to Delrac Corporation, Watertown, N. Y.

No Drawing. Application April 26, 1951, Serial No. 223,141

8 Claims. (Cl. 260—67.5)

The present invention is a continuation in part of my copending application, Serial No. 793,519, filed December 23, 1947, now abandoned, and relates to non-crazing furan resins and more particularly to furan resins capable of use and storage as a liquid in an intermediate stage of polymerization and capable of being subsequently set to a solid non-crazing resin. The invention further includes the method of forming such product.

Resins of furfuryl alcohol, furfuraldehyde and equal mixtures of such furans are known and it has also been proposed to use a small amount of furfuraldehyde as dry catalyst solvent for polymerization of furfuryl alcohol. Such resins while hard, tough and workable have had little utility generally, and particularly in adhesive and coating compositions, primarily because of their tendency to crack and craze.

It is accordingly a primary object of the present invention to form a non-crazing furfuryl alcohol-furfuraldehyde resin.

It is a further object to produce such resin in an intermediate polymeric liquid stage capable of use in adhesive and coating compositions.

It is a further object to provide methods of forming such products.

In the broad aspect of the present invention I have found that while furfuraldehyde, furfuralcohol mixtures and resins formed of such mixtures in substantially equal proportions form undesirably shrinking, cracking and crazing resins, such mixed resins will, when adjusted in proportions within the limits of 25% to 40% of furfural to 60% to 75% of furfuryl alcohol, exhibit pronounced stability and non-crazing properties. In the specific aspect I have found a resin mixture of about 2 parts of furfuryl alcohol to 1 part of furfuraldehyde to be perfectly stable and exhibit no tendency to craze or crack.

The resin may be formed to an intermediate liquid stage by interrupting the polymerization after a short period of reaction. Such liquid resin may subsequently set by further addition of catalyst.

In forming the partial polymer, the furfuraldehyde in proportion of 25%–40% and the furfuryl alcohol in proportion of 60%–75% are introduced into a conventional closed pressure-resistant kettle equipped with an agitator, and heating or cooling jacket for alternated introduction of steam for heating or water for cooling, whereby the temperature of the reaction may be rapidly controlled by introduction of steam or cold water into the jacket. A mineral acid, typically hydrochloric acid, in proportion of .1% to 4% is added to the mixture in the kettle. The contents of the kettle are thereafter heated and stirred by introduction of steam into the jacket until a temperature of about 190° F. is reached, whereupon the reaction begins and runs exothermically and rapidly. The temperature is allowed to reach the range of 240° to 275° F., but in no case is allowed to exceed the upper limit to avoid substantially complete polymerization of some of the components of the reaction mixture. Upon reaching this range, the temperature is quickly cut back to the range of about 200° to 230° and held at such lower temperature range to temper the intermediate resin for a short period of time of about 5 to 45 minutes, variable with the exact intermediate temperature selected. Thus, at about 220° F. the partial polymer will be tempered for about 30 minutes, and at about 200° F. the partial polymer would be tempered for about 45 minutes, and at a higher temperature of about 230° F. the partial polymer would be tempered for 5–10 minutes.

Another check upon the degree of tempering is the viscosity of the partial polymer produced. Thus, it is suitable to temper the partial polymer at the intermediate temperature until the liquid resin has a viscosity in the approximate range of 250 to 1000 cps. at 100° F.

The liquid resin is useful in coating compositions, with or without plasticizers, and may be applied without heat with good adhesion to seel, wood or concrete, setting by exposure to air. The film has good moisture and chemical resistance both to strong acids and alkalies and will not shrink, craze, strip or flake off. The liquid resin may also be set by addition of various generally acid type catalysts, with or without the use of filler materials. Such catalysts may be various acids or acid-reacting substances such as sulfuric, hydrochloric or phosphoric acids used in quantities of less than 4% and generally about .1% in concentrated form.

The following example will illustrate a typical procedure for forming the liquid resin.

*Example I*

25 gallons of furfuryl alcohol and 12.5 gallons of furfural are introduced into a closed jacketed kettle equipped with an agitator. 210 ml. of concentrated hydrochloric acid are slowly added to the agitated mass. The kettle is heated with steam circulated through the jacket. When the temperature of 190° F. is reached, the steam is cut off and the temperature of the agitated mass rises exothermically by the vigorous reaction which sets in. After the initial reaction has started, the temperature is controlled by passing cooling water through the kettle jacket, and by varying the rate of flow therethrough, any desired temperature may be maintained in the kettle. Slight temperature control is begun when the initial temperature reaches 200° to 210° F., but the temperature is allowed to rise. When it reaches the range of 240° to 275° F., it is quickly cut back to 220° F. by increasing the flow of cooling water. The reaction mass is held and tempered at 220° until the viscosity of the liquid partially polymerized resin reaches a desired viscosity generally about 500 cps. This tempering period is usually less than 10 minutes. After the desired viscosity has been reached, the reaction is quickly quenched, cooling with very rapid flow of cooling water to normal temperatures. The total time including the warming up, reaction, tempering and cooling periods is from 20 to 30 minutes. It will be understood that the reaction will proceed rapidly with rapid evolution of heat and the resin will warm up. The temperature must not be allowed to exceed 275° F. or the resin will set immediately to a solid. Pressures will build up in the closed kettle during the reaction but such pressure is prevented from exceeding 15 pounds per square inch by venting. Water formed during the reaction will separate in a layer from the resin and is removed.

*Example II*

The liquid resin prepared as described in Example I is applied as a coating to steel, wood or concrete. In the case of the wood and concrete the resin will penetrate into the porous surface. After 6 to 24 hours, depending on the porosity of the surface, the resin sets to give a non-tacky, strongly adherent, non-crazing film. The film is acid and alkali-resistant. Application of heat will accelerate the setting time.

*Example III*

The liquid resin of Example I is treated by adding .2% by weight of concentrated hydrochloric acid added dropwise thereto and mixed. The resin is then applied as a coating and sets in 45 minutes to a permanent non-crazing film. The setting may be accelerated by heat.

*Example IV*

The liquid resin of Example I is treated by adding 2 to 4% by volume of a saturated solution of ferric chloride in alcohol added with mixing. The resin is then applied as a coating and sets within thirty minutes to a permanent non-crazing film.

*Example V*

The liquid resin treated with acid, or other acid solution, as in Examples III and IV, is pumped as grouting filling to fill the spaces between a concrete wall and a brick lining and sets to a hard, non-cracking, chemically-resistant and strongly adherent filling material.

*Example VI*

The liquid resin of Example I, further treated with acid, or acid reacting substances, as in Examples III and IV, is cast with or without filling materials into molds of various shapes and forms tough non-crazing, non-cracking resinous bodies that may be readily machined.

Various modifications may be made within the spirit of the present invention and it is intended that the examples given be regarded as illustrative and not limiting and the invention be interpreted as broadly as defined in the claims.

I claim:

1. Method of forming a liquid furan resin comprising adding less than 4% of a mineral acid catalyst to a mixture comprising 60-75% of furfuryl alcohol and 25-40% of furfuraldehyde by volume, heating the mixture to initiate the reaction, quickly cooling the reaction mixture after a temperature within the range of 240° to 275° F. is reached to a temperature in the range of about 200° to 230° F. and holding the reaction mixture at such intermediate temperature until a viscous fluid mass is obtained, and then quenching the reaction by cooling to normal temperatures.

2. Method of forming a liquid furan resin comprising adding less than 4% of a mineral acid catalyst to a mixture comprising 60%-75% of furfuryl alcohol and 25%-40% of furfuraldehyde by volume, heating the mixture to initiate the reaction, quickly cooling the reacting mixture after a temperature within the range of 240°-275° F. is reached to a temperature about 220° F., and holding the reaction mixture at such intermediate temperature until a viscous fluid mass is obtained and then quenching the reaction by cooling to normal temperatures.

3. A substantially dry, stable liquid furan resin capable of setting in air to a solid, non-crazing resinous film, said liquid resin being formed by the method defined in claim 1.

4. A substantially dry, stable liquid furan resin capable of setting in air to a solid, non-crazing resinous film, said liquid resin being formed by partially polymerizing a mixture of substantially two parts of furfuryl alcohol and one part of furfuraldehyde by volume, according to the procedure defined in claim 1.

5. The method of forming a completely polymerized non-crazing, solid furan resin comprising distributing the resin formed in the method defined in claim 1 in films exposed to air and allowing the same to set.

6. The method of forming a completely polymerized non-crazing, solid furan resin comprising adding an additional small quantity of a mineral acid catalyst to the liquid resin formed by the method defined in claim 1.

7. A stable, non-crazing, solid furan resin formed by completely polymerizing the liquid partial polymer formed by the method defined in claim 1.

8. Method of forming a liquid furan resin comprising adding less than 4% of an acid catalyst to a mixture comprising 60% to 75% of furfuryl alcohol and 25% to 40% of furfuraldehyde by volume, heating to initiate the reaction, controlling the temperature of the reacting mass to prevent a temperature of 275° F. and cooling to normal temperature in a total heating and cooling cycle of less than 30 minutes.

BEAUMONT THOMAS.

No references cited.